J. D. REYMORE & R. E. VAN CISE.
APPARATUS FOR FILTERING MILK.
APPLICATION FILED JUNE 9, 1909.
950,211.
Patented Feb. 22, 1910.
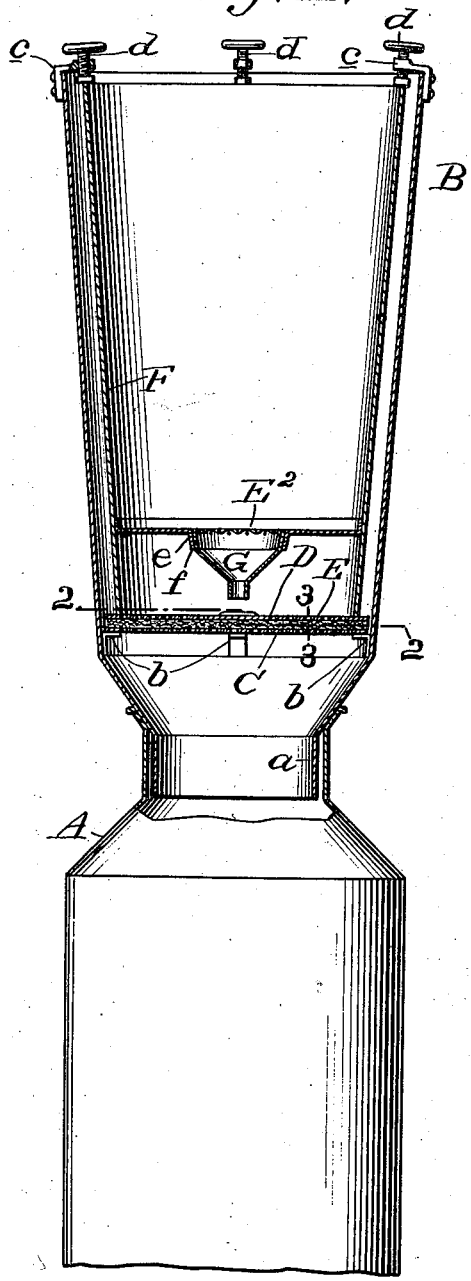
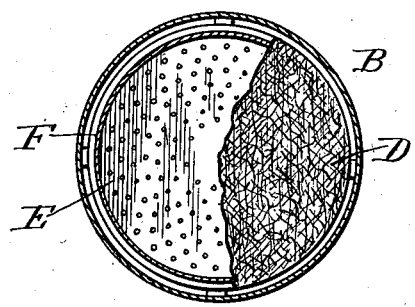
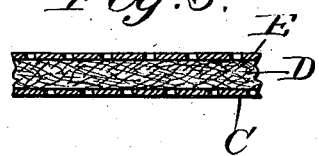
Witnesses
J. J. Sheehy Jr.
F. S. Sheehy
Inventors
J. D. Reymore
R. E. VanCise
By James Sheehy
Attorney

UNITED STATES PATENT OFFICE.

JOSEPH D. REYMORE AND RAY E. VAN CISE, OF OTEGO, NEW YORK.

APPARATUS FOR FILTERING MILK.

950,211.   Specification of Letters Patent.   Patented Feb. 22, 1910.

Application filed June 9, 1909. Serial No. 500,997.

*To all whom it may concern:*

Be it known that we, JOSEPH D. REYMORE and RAY E. VAN CISE, citizens of the United States, residing at Otego, in the county of Otsego and State of New York, have invented new and useful Improvements in Apparatus for Filtering Milk, of which the following is a specification.

Our invention has to do with the filtering of milk, and it contemplates the provision of efficient means for filtering hot milk such as much be handled at dairies, with a view of freeing the milk of bacteria so as to assure the same remaining sweet and wholesome for a considerable period.

With the foregoing in view the invention will be fully understood from the following description and claims when the same are read in connection with the drawings, accompanying and forming part of this specification, in which:

Figure 1 is a vertical section of the filter constituting the best practical embodiment of our invention that we have as yet devised as the same appears when properly positioned to discharge into a conventional milk can. Fig. 2 is a horizontal section taken in the plane indicated by the line 2—2 of Fig. 1, looking downwardly. Fig. 3 is a fragmentary vertical section taken in the plane indicated by the line 3—3 of Fig. 1 and illustrating the interposition of the disk of absorbent cotton or equivalent material between lower and upper foraminous diaphragms.

Similar letters designate corresponding parts in all of the views of the drawings, referring to which:

A is a conventional milk can which, in the present instance, is illustrated as a means of supporting our novel filter and receiving filtered milk therefrom.

B is the outer or casing section of the filter, which is preferably, though not necessarily, of circular form in cross-section. The said casing section terminates at its lower end in a portion $a$ adapted to rest in and on the can; and it is provided in its inner side about the distance shown above the portion $a$ with a support that is preferably in the form of equidistant ledges $b$. At its upper end the casing section is provided with a circular group of clamp bodies $c$ in which bear clamping screws $d$ for an important purpose hereinafter set forth.

Disposed on the ledges or supports $b$ is a foraminous diaphragm C, and upon said diaphragm is arranged a disk D, of absorbent cotton or equivalent material, that constitutes the filtering medium of our improvement.

On the filtering disk D is superposed a diaphragm E that is partly imperforate and partly foraminous; the central part being imperforate and being surrounded by the foraminous part, as appears in Figs. 1 and 2, in order to secure an advantage presently expressed.

F is an inner casing section adjustable vertically with respect to the outer casing section B and removable therefrom. Said inner casing section bears at its lower end on the upper diaphragm E, and is provided at about the distance shown above its lower end with an annular flange $e$ having at its inner edge a depending, tapered collar $f$, the office of which is to receive and support a preferably removable funnel G, disposed so that its contracted lower end will discharge upon the central imperforate part of the upper diaphragm E and having in its upper portion a strainer $E^2$. By virtue of this provision it will be manifest that the stream of milk discharged from the funnel is prevented from wearing a hole through the central portion of the filtering disk D, and that on the other hand the direction of movement of the stream of milk is changed and the same is distributed uniformly over all of the foraminous part of the diaphragm E precedent to passing downwardly through the interstices of the said foraminous part and the absorbent disk D. It will also be manifest that the said arrangement conduces to the even percolation of the milk through the absorbent filtering medium, and assures the milk being thoroughly robbed of bacteria and foreign substance before the milk is discharged from the filter.

The inner casing section F bears at its lower end upon the diaphragm E adjacent the perimeter of the latter, and is interposed between said diaphragm and the lower ends of the clamping screws $d$. From this it follows that when the clamping screws are turned downwardly, the two foraminous diaphragms and the filtering disk will be crowded between the casing section F and the ledges $b$ and securely held in such position. When, however, it is desired to separate the parts for cleaning or for the interposition of a fresh filtering disk between the diaphragms, the same can be readily accomplished after the screws $d$ are loosened and the inner casing section F is removed from the outer casing section B.

It will be gathered from the foregoing that the funnel G is an important feature of our filter, inasmuch as it regulates and renders uniform the flow of milk and in that way practically precludes clogging of the cotton disk. It will also be gathered that the filter is calculated to filter hot milk rapidly and in such manner as to free the milk of practically all of the bacteria present in the milk in the natural state thereof.

Our invention for sanitary reasons contemplates the use of the cotton disk D but once, and from the foregoing it will be readily understood that when necessity demands the used disk may be expeditiously and easily removed and a fresh disk substituted therefor.

While we have described the element F as an inner casing section, the said element F may obviously be of any other form consonant with the purpose of our invention and adapted to be interposed between the clamping screws $d$ and the upper diaphragm for the purpose hereinbefore set forth. We would also have it understood that while the construction herein shown and described constitutes the best practical embodiment of our invention of which we are cognizant, changes in the form and relative arrangement of parts may, in the future practice of the invention, be made without involving departure from the scope of our invention as defined in the appended claims.

Having described our invention, what we claim and desire to secure by Letters-Patent, is:

1. In a filter for hot milk, a filtering medium of absorbent material, a diaphragm disposed above the filtering material and having a central imperforate portion and a foraminous portion surrounding said imperforate portion, and a funnel adapted to be supplied with milk to be filtered and arranged to discharge the milk in a contracted stream on the imperforate portion of the said diaphragm.

2. The combination in a filter, of a casing section having an interior support and equipped at its upper end with clamp bodies and clamping screws bearing therein, lower and upper foraminous diaphragms and an absorbent disk therebetween, disposed on said support, and an inner casing section interposed between the upper diaphragm and said screws.

3. The combination in a filter, of a casing section, a filtering medium of absorbent material supported in said section, a diaphragm disposed above the filtering material and having a central imperforate portion and a foraminous portion surrounding said imperforate portion, a funnel supported by imperforate supporting means and arranged to discharge the milk in a contracted stream on the imperforate portion of the said diaphragm, and a strainer through which the milk passes *en route* to the contracted portion of the funnel.

4. A filter comprising a casing section having an interior support and equipped at its upper end with clamp bodies and clamping screws bearing therein, lower and upper foraminous diaphragms and an absorbent disk therebetween, disposed on said support, an inner casing section arranged in the first named section between the upper diaphragm and the screws and having an annular, interior flange and a tapered collar on the inner edge thereof, a funnel removably arranged in said collar and adapted to discharge a stream of milk on the imperforate portion of the upper diaphragm, and a strainer controlling the passage of milk to the contracted portion of the funnel.

In testimony whereof we have hereunto set our hands in presence of two subscribing witnesses.

JOSEPH D. REYMORE.
RAY E. VAN CISE.

Witnesses:
HARRY S. SMITH,
FRANK B. COOKE.